Aug. 18, 1931.     H. J. BURNISH     1,818,985
PIPE COUPLING
Filed March 17, 1928
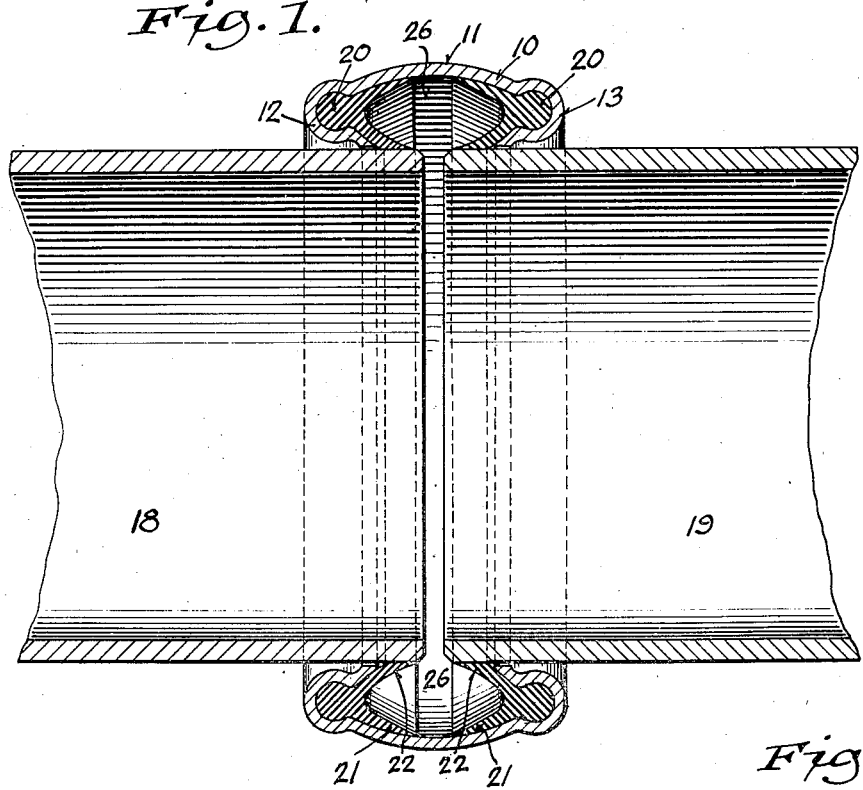
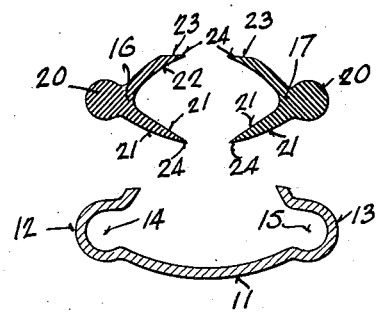
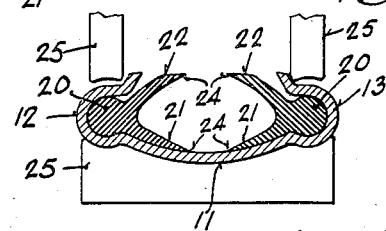
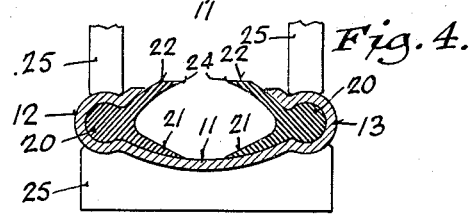
INVENTOR.
HOWARD J. BURNISH
BY
ATTORNEY.

Patented Aug. 18, 1931

1,818,985

UNITED STATES PATENT OFFICE

HOWARD J. BURNISH, OF MILWAUKEE, WISCONSIN, ASSIGNOR TO A. O. SMITH CORPORATION, OF MILWAUKEE, WISCONSIN, A CORPORATION OF NEW YORK

PIPE COUPLING

Application filed March 17, 1928. Serial No. 262,564.

The invention has more particular relation to a pipe coupling of the type into which direct insertion of a pipe is adapted to be accomplished by relative movement between the pipe and the coupling longitudinally of the portions thereof being assembled together.

One of the objects of the present invention is to provide a fluid seal for conduits having a tubular element and a sealing element enveloped by said tubular element adapted to enclose said conduit whereby fluid attempting to leave the conduit is adapted to come into direct contact with the sealing element in such manner as to maintain rather than to destroy the fluid seals, and to increase the efficiency of the seal as the pressure of the fluid so contacting the sealing element increases.

A still further purpose is to provide a pipe coupling of the present character in which various improved and specific features well adapting the coupling to the capable performance of its intended function will be incorporated.

The novelty residing in my invention and the manner in which it is reduced to practice will become apparent from the full description of the embodiment of the invention set forth in the drawings merely for the purpose of illustration.

Fig. 1 is a longitudinal central sectional view of a pipe coupling having the features of the invention and as applied to use;

Fig. 2 is a cross-sectional view of parts of the tubular member and the sealing units of the pipe coupling, disassembled;

Fig. 3 is a view similar to Fig. 2, but disclosing the sealing units associated with the tubular member ready to be secured therein, bending tools for accomplishing the securing of the sealing units also being shown;

Fig. 4 is a view similar to Fig. 3, but disclosing the bending tools as having acted to clamp the sealing units in the tubular member.

With respect to the drawings, 10 represents the novel pipe coupling, which consists, generally, of a strip of sheet metal shaped to annular form and welded to provide an inextensible tubular body 11 having reversely and inwardly turned opposite annular end portions, designated 12 and 13, providing inwardly opening annular pockets, indicated 14 and 15, housing spaced apart annular sealing units, denoted 16 and 17. The pipe sections 18 and 19 are inserted into the end portions 12 and 13, respectively, of the pipe coupling. The portion of the tubular body 11 between and about the sealing units 16 and 17 is preferably bellied outwardly in about the manner as shown.

Each sealing unit 16, 17 comprises an annular bead 20 seated in the annular pocket 14 or 15, as the case may be, an inwardly extending, outer, resilient flexible annular sealing element 21 integral with the bead and in engagement with the belly of the tubular body, and an inwardly extending, inner, resilient, flexible annular sealing element 22 also inflexible annular sealing element 22 also integral with the bead and protruding beyond the corresponding inturned end portion and adapted to envelop a pipe section 18 or 19, as the case may be. Preferably, the sealing elements 21 and 22 of each sealing unit have tendency toward spreading apart, the former expanding to snugly engage the internal surface of the tubular body for its full circumference and the latter contracting to snugly envelop the external surface of a pipe section, and the annular sealing elements 21, 21 and 22, 22, respectively, of the finished couplings are desirably situated in about the aligning and spaced apart relation as disclosed. As shown, the free marginal portions 23 of all of the annular sealing elements 21, 21, 22, 22 are beveled or tapered to terminate in marginal knife edges 24.

The annular bead 20 of each sealing unit can be secured in an annular pocket 14 or 15, as may be the case, in any ordinary or desired way. I prefer, however, to clamp the beads in the pockets in about the manner indicated in Figs. 2 to 4. As shown in Fig. 2, the inturned end portions 12 and 13 are not clamped down, but are at location relatively to the body of the tube to allow ready insertion into the pockets 14 and 15 of the annular sealing units 16 and 17, in a manner which will be apparent. In Fig. 3 I have disclosed said annular sealing units situated in said pockets, and bending tools 25 positioned to force said inturned end portions in clamped down position upon the annular beads 20. In Fig. 4 there is disclosed the bending tools as having acted to rigidly confine the annular beads in the annular pockets of the tubular member.

The tubular member 11 is desirably constructed of steel. The free sealing elements of each sealing unit must be of flexible or pliable material, such, for example, as rubber, leather, fabric, or the like, while the bead of each sealing unit has sufficient body to insure the set relation of the sealing unit in the inextensible tubular member. It will be clear that the bead 20 could be dispensed with and the material of each sealing unit between and integral with the annular sealing elements thereof glued or otherwise seated in the annular pockets of the tubular member.

The pipe sections 18 and 19 are assembled with the coupling 10 by directly inserting said pipe sections longitudinally into the opposite end portions of said coupling and past the annular sealing elements 22 thereof to about the positions as disclosed, preferably so that the pipe sections are short of actually meeting. Desirably, the internal surfaces of the reversely and inwardly turned opposite annular end portions 12 and 13 snugly embrace the external surfaces of the pipe sections 18 and 19 at locations spaced from their adjacent extremities when so inserted in the pipe coupling. When the coupling and the pipe sections are assembled, a chamber 26 within the pipe coupling, bounded at its outer side by the sealing elements 21 and the tubular member of the pipe coupling, at its inner side by the sealing elements 22 and the adjacent parts of the pipe sections, and at its opposite ends by the integral portions of the sealing units between said elements 21 and 22, is communicated with by the pipe sections, as will be evident.

It will be obvious that fluid attempting to leave the pipe sections by way of the fluid seals of the coupling, will enter the annular chamber 26 and exert pressure against the sealing elements 21, 21, 22, 22 which will cause them to engage the internal surface of the tubular member and the external surfaces of the pipe sections under pressure, additional to their normal pressure, commensurate with the fluid pressure, to thus have tendency toward maintaining, rather than toward breaking down or destroying, the fluid seals, and toward increasing their efficiency with the increase of fluid pressure. Thus, the passage of fluid outwardly from the chamber 26 past the fluid seals is impossible.

A coupling of the general construction as described possesses various apparent attributes rendering it flexible, capable and efficient to the purpose of its employment, it admitting of expansive and contractive movement of associated pipes and of relative bending at the joint between coupling and pipe without impairment of the fluid seals, for the reason that no rigid clamping means is present, and the sealing elements are flexibly associated with the pipe surfaces and the coupling to readily conform to changing relation of the pipe sections to the coupling, as will be understood.

Having thus described my invention, what I claim and desire to secure by Letters Patent of the United States, is:

1. A pipe coupling comprising an annular element having oppositely disposed flexible re-entrant portions defining inwardly extending throated recesses, flexible annular sealing elements having a portion clamped in said recesses each of said flexible sealing elements comprising an outwardly flaring flexible flange and an inwardly flaring flexible flange, said outwardly flaring flanges being adapted to tightly engage said annular element, and said inwardly flaring flanges being adapted to engage separate pipe sections to effect a fluid seal between said pipe sections.

2. A fluid seal for conduits comprising an annular element having a flexible re-entrant portion defining an inwardly extending throated recess, a flexible resilient sealing element having a portion clamped in said recess by said throat portion and having a pair of oppositely disposed tapering resilient flanges one of which is adapted to engage said annular element and the other to engage the conduit whereby a tight seal is effected by pressure of the fluid against said flange.

3. A pipe coupling comprising a sheet metal annular element having oppositely disposed flexible re-entrant portions defining inwardly extending throated recesses and resilient sealing means partially confined in said throated recesses and adapted to engage the outer walls of the pipe sections being coupled to provide a seal therewith.

In testimony whereof I have signed my name at Milwaukee, this 15th day of March, 1928.

HOWARD J. BURNISH.